April 11, 1967     J. A. KNIEFEL     3,313,115
MACHINE FOR LAYING FLEXIBLE PIPE WITH ATTACHED RISERS
Filed April 23, 1965     2 Sheets-Sheet 1

INVENTOR.
JOSEPH A. KNIEFEL
BY Knox & Knox

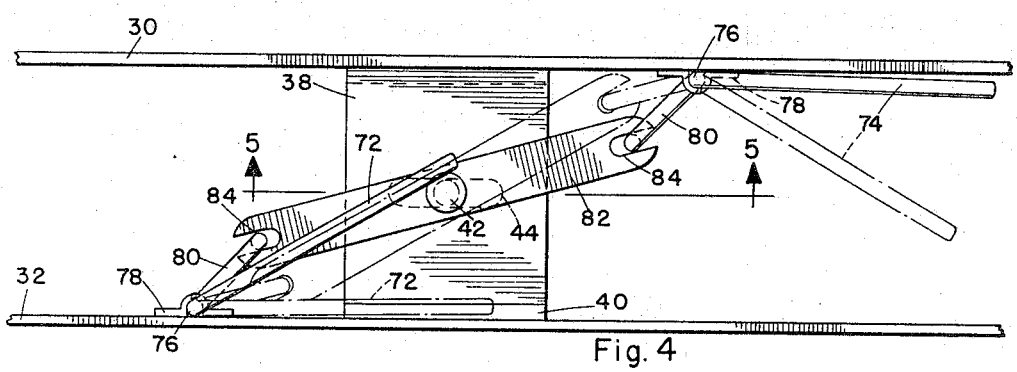
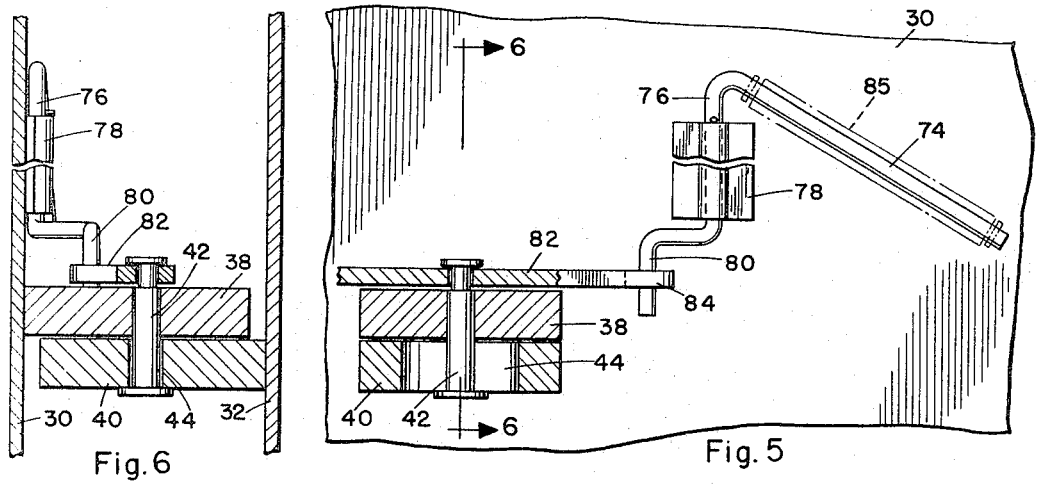
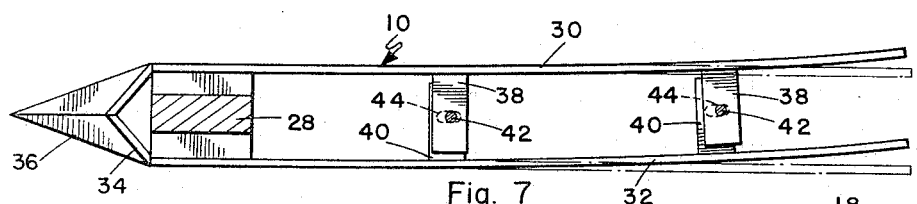
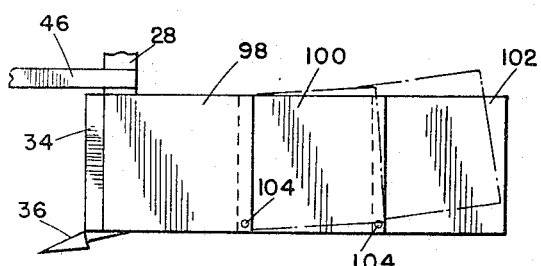
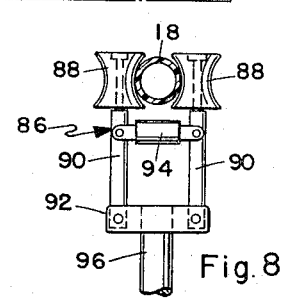
INVENTOR.
JOSEPH A. KNIEFEL

United States Patent Office 3,313,115
Patented Apr. 11, 1967

3,313,115
MACHINE FOR LAYING FLEXIBLE PIPE
WITH ATTACHED RISERS
Joseph A. Kniefel, Fallbrook, Calif. 92028
Filed Apr. 23, 1965, Ser. No. 450,394
7 Claims. (Cl. 61—72.6)

The present invention relates generally to pipe laying and more specifically to an improved machine for laying flexible pipe with attached risers.

The primary object of this invention is to provide a pipe laying machine which will lay semi-rigid or flexible pipe with attached risers, such as used in irrigation systems, with the risers in properly erect position and at a controlled depth to ensure correct positioning of the riser ends for spray fittings or the like, the machine being capable of laying the pipe in straight or curved runs in continuous operation.

Another object of this invention is to provide a pipe laying machine employing a trenching unit with novel pipe guiding means which allows the width of the unit and the resultant trench to be kept to a minimum, thereby simplifying the refilling and tamping of soil in the trench, which is carried out automatically by the machine.

Another object of this invention is to provide a pipe laying machine which can be towed by a tractor or similar vehicle and which, once initially set up, can be controlled entirely by a single operator on the vehicle.

In the drawings:

FIGURE 4 is an enlarged top plan view of one pipe guiding linkage;

FIGURE 5 is a sectional view taken on line 5—5 of FIGURE 4;

FIGURE 6 is a sectional view taken on line 6—6 of FIGURE 5;

FIGURE 7 is a top plan view of the trenching unit, with the pipe guides omitted, illustrating the flexibility for following curves;

FIGURE 8 is an enlarged sectional view taken on line 8—8 of FIGURE 1; and

FIGURE 9 is a side elevation view of a modified trenching unit with hinged sections.

Similar characters of reference indicate similar or identical elements and portions throughout the specification and throughout the views of the drawing.

Figure 1:
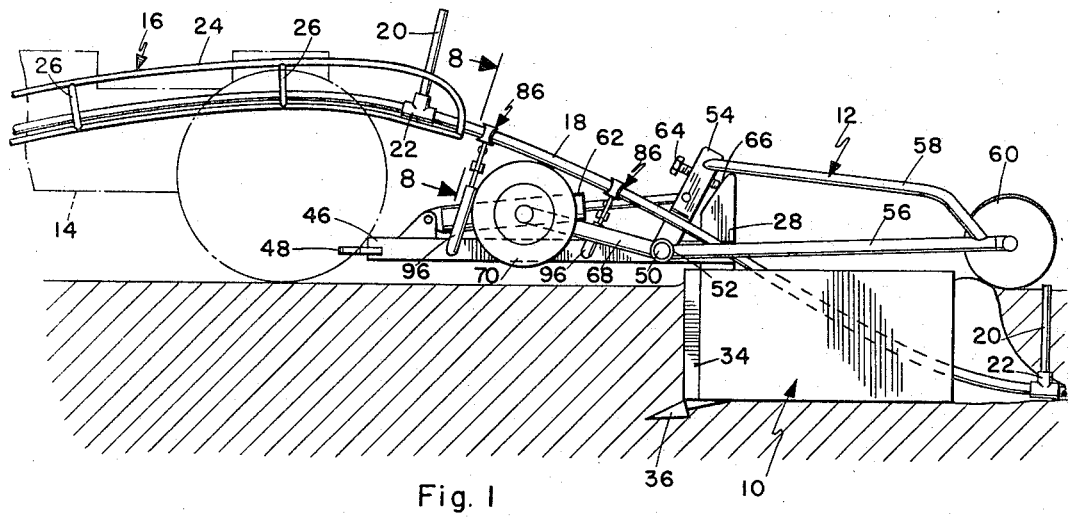
FIGURE 1 is a side elevation view of the machine in operation.
Figure 2:
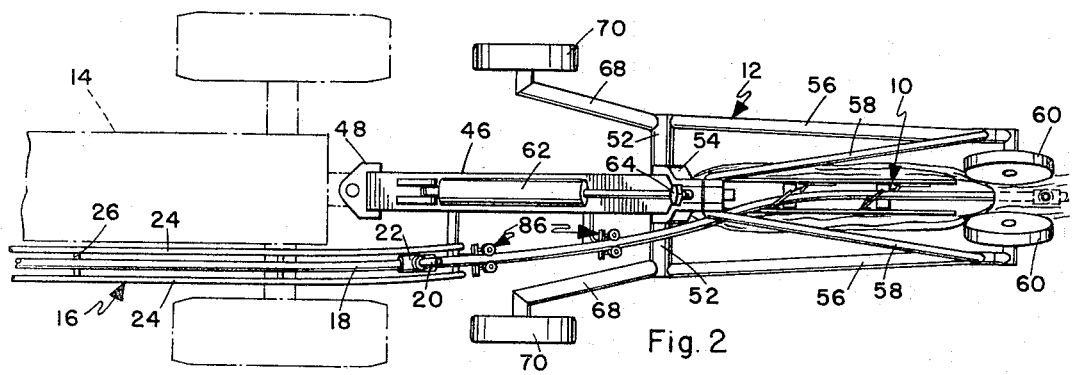
FIGURE 2 is a top plan view thereof.

As illustrated in FIGURES 1 and 2, the complete machine includes a trenching unit 10 carried by a wheeled carriage 12, which is towed by a tractor 14, or similar vehicle. On the side of the tractor is mounted a pick-up rack 16 to carry the pipe 18 to the trenching unit, the pipe being pre-assembled with risers 20 in T-connections 22. Normally the assembled pipe with suitably positioned risers is placed on the ground along the line where it is to be buried and is thus picked up and fed through the machine as it advances. Pick-up rack 16 comprises a pair of spaced parallel guide rails 24 joined by generally U-shaped yokes 26 and is mounted on tractor 14 in any suitable manner. The pipe 18 rides on the yokes 26 and the risers 20 are held upright between the guide rails 24. The pick-up rack and its operation are shown and described in my U.S. Patent No. 2,909,134, for a similar type of pipe laying machine.

The trenching unit 10 comprises an upright pillar 28 to which are fixed a pair of side plates 30 and 32 extending rearwardly, the forward ends of the side plates being joined by a V-shaped nose cutter 34. Fixed to the lower end of pillar 28 is a forwardly projecting subsoil blade 36 to hold the unit down during trenching. Secured to the inner face of side plate 30 are horizontally extending connecting brackets 38 while secured to the inner face of side plate 32 are corresponding slide brackets 40 which extend beneath said connecting brackets. In each connecting bracket 38 is a connecting pin 42 which projects downwardly through a slot 44 in the slide bracket 40, the slot being elongated in a direction parallel to the plane of side plate 32. The side plates are thus held in spaced parallel relation, but can be curved as illustrated in FIGURE 7, the slots 44 allowing slippage of the connected brackets to accommodate the relative displacement of the side plates, the top, bottom and rear end of the trenching unit being open. Pillar 28 extends upwardly and is rigidly fixed to the rear end of a tow bar 46, the forward end of which carries a tongue 48, or similar fitting, for connection to the towing vehicle.

Adjaent the rear end of tow bar 46 is a horizontal cross shaft 50 carrying a pair of rotatable sleeves 52 on opposite sides of the tow bar, said sleeves being coupled together by a substantially upright forked post 54. Fixed to the outer end of each sleeve 52 is a trailing arm 56 reinforced by a brace 58 from the rear end thereof to the top of post 54, and mounted on the rear end of each trailing arm is a tamping wheel 60. The trailing arms form an open ended frame carrying a pair of opposed tamping wheels 60 which are inclined inwardly below the arms and can be adjustable if necessary, the arrangement being well known in furrowing and filling implements. A jack 62, or similar linear actuator, is connected between post 54 and the tow bar 46 for raising or lowering the arms 56 to adjust the depth of cut of the trenching unit 10. A specific depth can be held by a stop screw 64 threaded through post 54 and bearing on a stop face 66 on the upper end of pillar 28. For transportation purposes the carriage 12 is provided with legs 68 fixed to sleeves 52 and extending opposite to the trailing arms 56, said legs carrying riding wheels 70. When the trenching unit is in use the riding wheels 70 are held clear of the surface, as in FIGURE 1 but, by retracting jack 62 sufficiently, the carriage can be swung about cross shaft 50 to raise trailing arms and lower the riding wheels to the ground. Legs 68 are of sufficient length to hold the trenching unit 10 clear of the ground in this latter position to facilitate towing.

Figure 3:
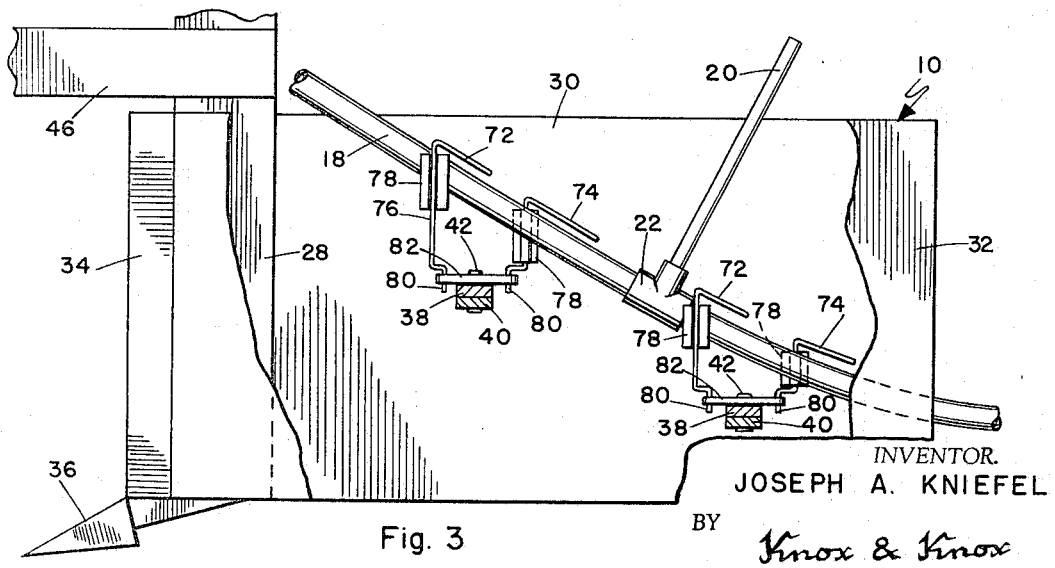
FIGURE 3 is an enlarged side view, partially cut away, of the trenching and pipe guiding unit.

The pipe 18 is fed from the rack 16, past the side of pillar 28 and down into the trenching unit 10. To guide the pipe smoothly into the proper position for burial at the bottom of the trench the trenching unit is provided with guiding means conveniently mounted in part on the connecting brackets 38, which are suitably positioned in stepped down relationship to conform to the required path of the pipe. Each guiding means comprises a pair of fingers 72 and 74, the finger 72 being mounted on side plate 32 forward of the connecting bracket 38 and the finger 74 of the pair being mounted on side plate 30 to the rear of the bracket. Each finger has a vertical shaft portion 76 which is pivotal in a hinge bracket 78 secured to the respective side plate, the lower end of the shaft portion having a crank arm 80. The shaft portions 76 of fingers 72 are shown in FIG. 3 as longer than the shaft portions 76 of fingers 74, thus carrying forward the said stepped down relationship for smoothly curving the pipe downwardly. The fingers can be formed from rod or bar material and are of sufficient length to extend slightly more than half way across the trenching unit when trailing at a shallow angle rearwardly of the respective hinge bracket, said fingers being inclined downwardly to the rear to follow the general path of the pipe. The fingers of each pair are interconnected by a coupling bar 82 having slotted ends 84 to engage the crank arms 80, the coupling bar being pivotally held at its center on the connecting pin 42. Crank arms 80 are disposed so that when one finger is extending angularly across the trenching unit, the other finger is flat along its adjacent side plate. The pipe 18 is inserted under the fingers and is held down and guided in a smooth curve to the lower rear portion of the trenching unit. As the pipe is fed through each riser 20 will engage the finger 72 of each pair and swing that finger back against the side plate 32, as indicated in broken line position in FIGURE 4. This, however, will cause finger 74 to swing out over the pipe, so that at all times at least one finger of each pair will be holding the pipe down. When the riser engages the finger 74, that finger will be pushed back and the finger 72 will swing out. Thus the risers can pass easily through the successive staggered fingers without any lateral displacement, which reduces the spacing needed between the side plates to accommodate the pipe and so reduces the width of the trench to be cut. Due to the particular arrangement and interconnection of the pipe guiding fingers they are operable even when the side plates are curved, the length of slots 44 limiting the displacement and curvature to a reasonable degree, so that the structure is not strained. To reduce friction further the fingers 72 and 74 may be fitted with freely rotatable rollers 85, as indicated in broken line in FIGURE 5, any suitable retaining means being used to hold the rollers in place on the fingers.

To guide the pipe from rack 16 to the trenching unit 10 roller guides 86 can be mounted at suitable locations on the tow bar 46. Each roller guide 86 comprises a pair of concave rollers 88 to hold pipe 18 firmly, as in FIGURE 8, the rollers being freely rotatable on the upper ends of spindles 90 which are hinged at their lower ends on a cross bar 92 to swing outwardly for insertion of the pipe. Secured between the spindles 90 is a resilient tension member 94, such as a spring, to hold the rollers 88 firmly against the pipe and prevent slippage, while allowing the T-connections to pass through. The cross bar 92 is fixed to a support post 96 of suitable height to support the pipe in a smooth natural curve.

For unusual terrain characteristics, or for special types of pipe, it may be desirable to have some freedom to follow undulations in the vertical plane in order to prevent sudden bends in the pipe. For this purpose the trenching unit can be made in a segmented form, as in FIGURE 9. The forward portion 98 of this trenching unit is as described above, although the length could be shortened, then added to the rear thereof are extension units 100 and 102 connected at the lower overlapping corners by hinges 104. The extension units are composed of side plates interconnected by brackets as in the main trenching unit and may include as many guide finger assemblies as necessary to guide the pipe throughout the entire length.

In operation the machine will start from the surface and at the trench to the set depth, then as the vehicle moves forward the pipe will be picked up on rack 16, fed through roller guides 86 to the trenching unit 10 and guided down to the bottom of the continuously opening trench with the risers accurately placed upright. Tamping wheels 60 fill and tamp the trench to complete the setting. With the irrigation system pre-assembled and laid out in place the operation can be carried out by a single operator on the towing vehicle and, with the flexibility of the trenching unit, the pipe can be laid around curves at the ends between adjacent rows of pipe, so avoiding the need for stopping to make special connections and cut cross trenches.

It is understood that minor variation from the form of the invention disclosed herein may be made without departure from the spirit and scope of the invention, and that the specification and drawings are to be considered as merely illustrative rather than limiting.

I claim:
1. A machine for laying flexible pipe with attached risers, comprising:
   a trenching unit having means for attachment to a towing vehicle;
   said trenching unit having a front ground penetrating cutter with side plates fixed to and extending rearwardly therefrom, said side plates being interconnected in spaced parallel relation;
   pipe guiding means in said trenching unit, including fingers pivotally mounted on said side plates to swing across the space between the side plates above a pipe passing therethrough;
   said fingers being interconnected in pairs to swing in opposite directions, whereby one finger of each pair is extended between the side plates when the other finger of that pair is swung back by passage of a riser on the pipe.

2. A pipe laying machine according to claim 1, wherein said fingers are successively staggered on opposite side plates in a stepped down relationship descending from front to rear to guide a pipe smoothly downwardly to the lower rear portion of said trenching unit.

3. Apparatus according to claim 2 wherein the fingers of each said pair of fingers are arranged in correspondingly stepped down relationship.

4. A machine for laying flexible pipe with attached risers, comprising:
   a trenching unit having means for attachment to a towing vehicle;
   said trenching unit having a front ground penetrating cutter with side plates fixed to and extending rearwardly therefrom;
   bracket means interconnecting said side plates in spaced parallel relation, said bracket means having slidable portions allowing limited curvature of the side plates for accommodation to a curving trench;
   pipe guiding means in said trenching unit, including fingers pivotally mounted on said side plates to swing across the space between the side plates above a pipe passing therethrough;
   said fingers being interconnected in pairs to swing in opposite direction, whereby one finger of each pair is extended between the side plates when the other finger of that pair is swung back by passing of a riser on the pipe.

5. A pipe laying machine according to claim 4, wherein said fingers are successively staggered in pairs on opposite side plates adjacent each of said bracket means.

6. A pipe laying machine according to claim 5, wherein said fingers have crank arms, and including a coupling bar pivotally mounted on each said braket means and interconnecting the crank arms of a pair of fingers.

7. A pipe laying machine according to claim 4 and including extension side plate portions pivotally attached to the rear of said side plates in continued spaced parallel relation for limited pivotal movement about horizontal axes to permit the extension side plates to accommodate to a slightly vertically undulating trench.

References Cited by the Examiner

UNITED STATES PATENTS

| 734,615 | 7/1903 | Roberts | 61—72.6 |
| 2,909,134 | 10/1959 | Kniefel | 61—72.6 |

FOREIGN PATENTS 632,269  11/1949  Great Britain.

ERNEST R. PURSER, *Primary Examiner.*